April 12, 1960 L. F. KOOISTRA 2,932,721
METALLIC ARC WELDING WITH STABILIZED INERT GAS SHIELDING
Filed Feb. 14, 1952 2 Sheets-Sheet 1

INVENTOR.
Lambert F. Kooistra
BY
J. P. Moran
ATTORNEY

United States Patent Office 2,932,721
Patented Apr. 12, 1960

2,932,721

METALLIC ARC WELDING WITH STABILIZED INERT GAS SHIELDING

Lambert F. Kooistra, Akron, Ohio, assignor to The Babcock & Wilcox Company, Jersey City, N.J., a corporation of New Jersey Application February 14, 1952, Serial No. 271,508

4 Claims. (Cl. 219—74)

This invention relates to electric arc welding in which at least one of the arcing electrodes is fusible metal and in which the arc and the welding zone are shielded or blanketed by a gaseous envelope comprising primarily an inert preferably monatomic gas.

Shielding with inert gases has been successfully employed for a considerable time in arc welding with non-consumable electrodes. For example, one known method involves the shielding with helium of an arc welding operation in which the arc is maintained between a tungsten electrode and the work. Other inert gases have also been used for shielding in such arc welding operations.

Generally, a soft non-turbulent stream of inert gas is introduced about the arc through a suitable nozzle or manifold. This blanketing shield of gas protects the metal at the welding zone from atmospheric contamination. Certain important advantages result from the use of a gaseous protecting medium or shielding of this type. Due to the absence of reactive slag compounds, which result from slag shielding of the welding zone, there is a minimum loss in metallic elements and no necessity for slag removal.

These considerations are of even greater importance when an inert gas is used for shielding in metallic arc welding with a consumable electrode. For example, the gas shielding eliminates the usual electrode coating, which generally produces a slag covering the welding zone, thus requiring no cutting of the coating for electrical contact. However, while inert gas shielded metallic arc welding has been applied successfully in the welding of aluminum, and to a lesser extent in non-ferrous and stainless steel welding, its application to carbon steel welding has involved a great number of difficulties.

The composition and quality of the electrode wire or rod is more critical, so that the usual available commercial grades of carbon steel wire can not be used satisfactorily in an inert gas shielded welding operation. The stability of the arc, as measured by fluctuations in arc length, by variations in arc voltage and amperage, and by the nature of the arc, whether it is a spray type or a globular type of metal transfer, exerts a powerful influence on weld quality. When an inert gas shield, such as an enveloping stream of argon, for example, is used in arc welding with consumable metallic electrodes such as carbon steel wire, the arc tends to become unstable. Erratic arc behavior is produced by minor fluctuations in arc length and voltage-amperage characteristics. This becomes increasingly of importance when the method is applied to automatic welding. In such case, the erratic nature of the arc requires constant manual operation of the controls to maintain stability.

In accordance with the present invention, it has been found that the stability of the arc, as measured by fluctuations in arc length, and by variations in arc voltage and amperage, as well as substantial reduction in the size of the metal droplets transferred through the arc, can be attained by the addition of minor percentages of relatively active gases to the main inert shielding gas, such as argon. Furthermore, the quality and composition of the welding wire become far less critical. The result is that the operating characteristics are improved to a high degree, which is particularly evident when using automatic welding apparatus with consumable metal electrodes and with an automatic arc control responsive to fluctuations in arc length.

More particularly, it has been found that relatively minor additions of carbon monoxide and carbon dioxide to argon are particularly effective in so improving the arc characteristics. Minor percentages of nitrogen and helium in an argon shielding stream are also effective.

For an understanding of the invention method, reference is made to the following description of typical embodiments thereof as illustrated in the accompanying drawings.

In accordance with the present invention, it has been found that the arc characteristics and quality of the weld, when welding with consumable metal electrodes, particularly carbon steel, is an inert atmosphere of a monatomic gas, such as argon, can be greatly improved by the addition to the argon stream of from 1% to 20% of $CO_2$ or CO. Optimum results are attained when using from 3% to 10% of such additions with the argon, and particularly when using $CO_2$ as the addition. Additions of CO, He and $N_2$ also improve the arc characteristics. While a shielding gas stream of argon with a minor addition of the mentioned relatively active gases is preferred, improved results are also attained by additions of a relatively active gas to other inert monatomic gases, such as helium, when such an inert gas is used to shield a consumable metallic electrode arc welding operation.

The invention is of particular importance as applied to inert gas shielded arc welding with carbon steel welding wire. For example, an electrode with a relatively high carbon content of substantially 0.35% results in an advantageously stable arc characteristic in inert gas welding, but has the disadvantage that the deposited weld metal is crack sensitive. When the invention process, involving the addition of a minor percentage of an active gas to the primary inert gas, is used with a carbon steel having a normal low carbon content welding wire, a noticeable improvement in the welded bead is attained, and the stability of the arc is even more enhanced than when using a high carbon steel welding wire.

Among other advantageous features of the invention arrangement is the obtaining of a very smooth and uniform deposited weld bead, particularly when the addition gas is $CO_2$. This is, at least in part, due to the great decrease in metal droplet size when using these additions. At higher amperage values, the droplets become so small that they tend to form a spray in which the individual droplets are extremely difficult to distinguish. Voltage and amperage fluctuations have been found to be largely a corollary of the size of the metal droplets or particles transferred across the arc. Hence, with increasing fineness of the particle or droplet size, there is a corresponding decrease in voltage or amperage fluctuations so that the volt and ampere curves are substantially smooth when plotted on a graph.

Figure 1:
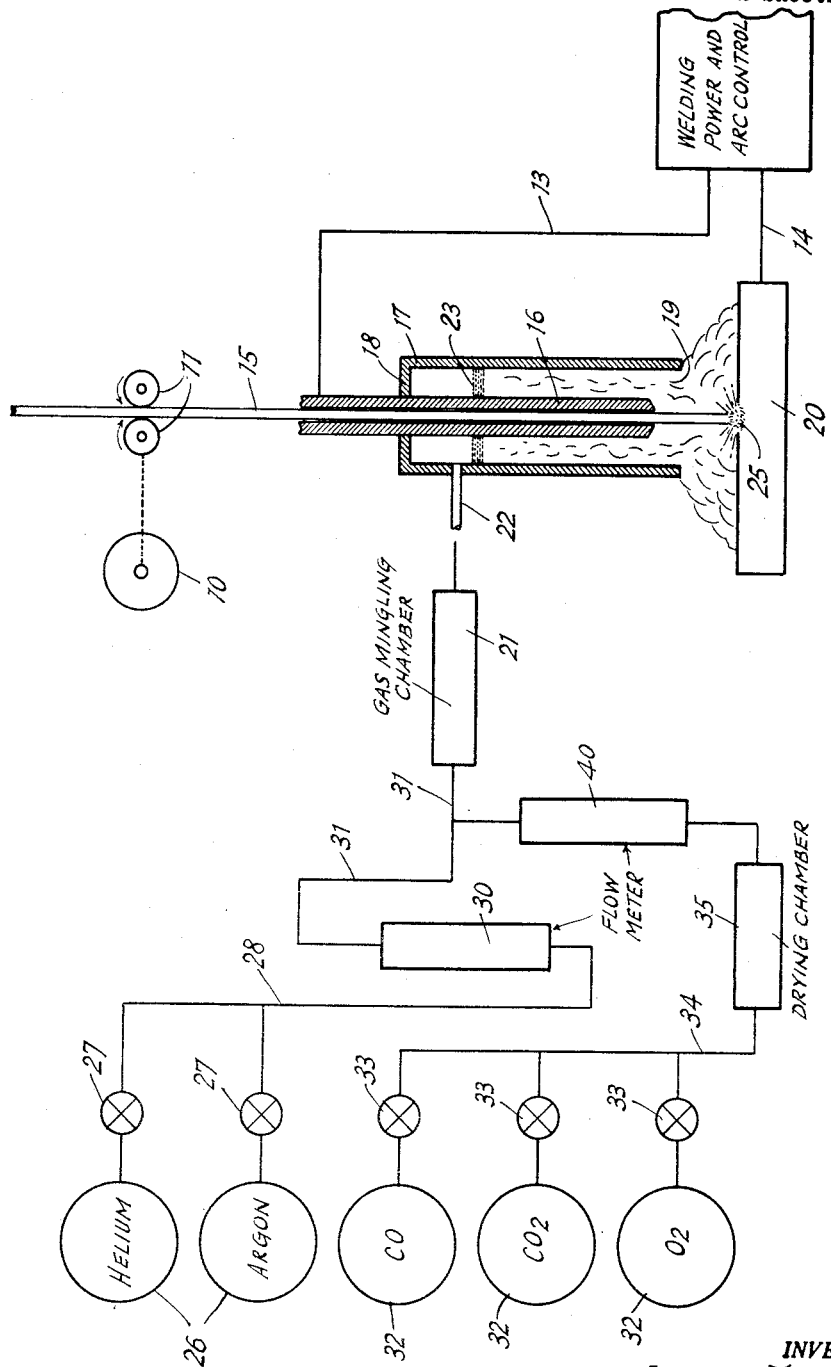
Fig. 1 is a schematic layout of automatic welding apparatus which may be used to perform the invention method.

Fig. 1 schematically illustrates a welding arrangement for practicing the present invention and comprising an automatic welding head including an electric motor 10 which, through suitable gearing, drives feed rolls 11 which feed a welding wire or rod 15 toward a workpiece 20. A welding power and arc control 12 is connected, by conductors 13—14, across the arc and varies the rod feeding speed in accordance with changes in arc length as determined, for example, by measurement of the arc voltage or current. Welding wire 15 is fed through a collet or guide 16 disposed substantially centrally within a gas manifold 17 which is closed at its inner end as at 18 and has an open outer end 19 adjacent workpiece 20.

Collet 16 extending through chamber 17 forms therewith an annular gas chamber embracing the welding rod, and which receives gas from a mixing chamber 21 through a conduit 22 extending through the wall of manifold 17. A screen diffuser 23 is located in the manifold downstream of conduit 22 and serves to break-up the gas stream into a smoothly flowing non-turbulent envelope passing downwardly through manifold 17 and discharging from open end 19 in embracing relation to welding rod 15 and the arc 25, the gas envelope also protecting and blanketing the welding zone on workpiece 20.

The primary inert gas, such as argon or helium, is fed from suitable containers, such as 26, through regulating valves 27 into a main 28 leading to a flowmeter 30. A main 31 connects flowmeter 30 to the gas mixing chamber 21. The additive secondary gases are supplied from containers 32 through regulating and shut-off valves 33 to a main 34 which leads, through a drying chamber 35 and a flowmeter 40, to main 31. The additive gases are mixed with the primary gas in the chamber 21, for delivery of the mixture to manifold 17. However, such premixing is not necessary to successful practice of the invention, and both the primary and additive gases may be fed separately to manifold 17 for eventual mixing in flowing therefrom around the electrode 15 to the weld zone.

The arrangement illustrated is essentially a test apparatus whereby the effects of varying additions of different gases to either of the primary gases may be observed. To simplify the drawing, only the containers for CO and $CO_2$ as additive gases have been illustrated, the third additive gas container 32 representing other active gases such as helium or nitrogen.

In utilization of the described apparatus, the valves 27 and 33 are selectively adjusted so that from 1% to 20% of a selected additive gas from containers 32 may be added to the primary gas from containers 26, the relative flow rates of the primary and additive gases being determined by meters 30 and 40 respectively.

In the practice of the invention, it has been found that additions of minor percentages of $CO_2$ to argon, as the primary inert monatomic gas, have produced the most effective results insofar as arc stability and quality of the deposited weld bead are concerned. While improved results over the use of the primary monatomic gas alone have been obtained with additions of CO, He and $N_2$, the results with these additions were not as outstanding as those with additions of $CO_2$.

Figures 2, 3:
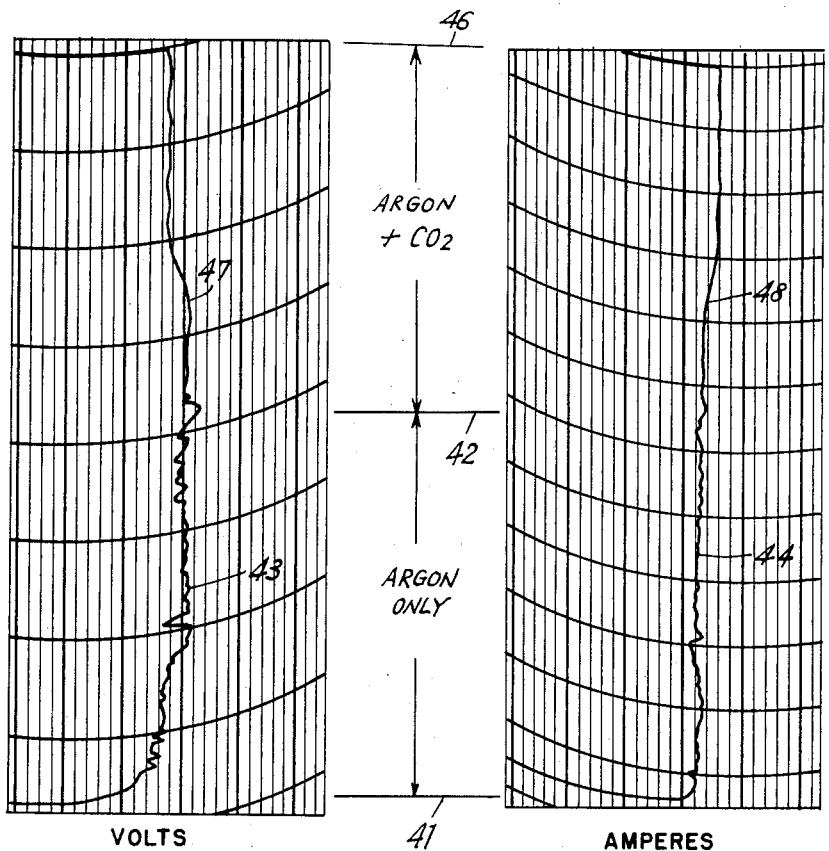
Figs. 2 and 3 are arc voltage and arc amperage curves graphically illustrating the improvement in arc stability attained by addition of a minor percentage of carbon dioxide to an argon arc shielding stream.

Referring to Figs. 2 and 3, the improved results with the addition of $CO_2$ to argon are graphically depicted. Fig. 2 shows the voltage curve and Fig. 3 shows the amperage curve, with the commencement of the weld being at the bottom of the figure and the termination of the weld at the top thereof. From the base line 41 to the intermediate line 42, argon only was used as the shielding medium resulting in the widely fluctuating voltage, as indicated by the graph line 43, and fluctuating amperage, as indicated by the graph line 44. When $CO_2$ was added to the argon in that portion of the figure included between intermediate line 42 and upper line 46, both the voltage and amperage curves smoothed out remarkably, as illustrated at 47 and 48, respectively. The smoothness of the voltage and amperage curves is increased as the current rate is increased, the particular curves shown representing a current of 410–430 amp. when using argon alone, and from 440–460 amp. when using $CO_2$ added to argon, the uppermost part of the curves representing the highest amperage.

When $CO_2$ is added to argon protected automatic arc welding operations using carbon steel electrodes, there is an immediate increase in arc voltage and arc length. When the controls are adjusted to return the arc to its initial length (as the arc length was with argon alone) the arc voltage is reduced below the original arc voltage pertaining when only argon is supplied to the arc. The addition of $CO_2$ to the argon, with a constant arc length, lowers the arc voltage and resistance and produces a fine spray type arc of improved stability.

When CO is added to an argon shielded arc welding operation using a carbon steel electrode, there is an immediate increase in arc voltage but the arc length is reduced. When the apparatus is adjusted to re-attain the original arc length, the arc voltage is increased again. With $CO_2$ added to argon shielding in a constant arc length welding operation, the voltage and resistance of the arc are reduced and a fine spray type arc of improved stability is attained.

Nitrogen or helium additions to argon result in the same type of arc behavior as with a CO addition.

The stabilizing effect of the additive gases is apparent not only at normal current densities, but also at current densities higher than 100,000 amp. per sq. in. and with metal deposit rates in excess of 30 lbs. per hour. When an automatic arc control is used, the arc is uniform with very minor fluctuations in arc voltage and arc amperage. Commercial grades of carbon steel electrode wire produce satisfactory results, depositing a bead of excellent quality and having more advantageous burn-off rates and power consumption as compared with the welding using argon alone. The best results are obtained when using from 3%–10% of an active gas mixed with the primary inert gas, although good results are obtained over an additive range of from 1%–20%.

While specific embodiments of the invention have been shown and described in detail to illustrate the application of the invention principles, it will be understood that the invention may be otherwise embodied without departing from such principles.

I claim:

1. A method of electric arc fusion welding including maintaining an arc between a low carbon steel electrode, having a carbon content of less than 0.35 percent, and the work; and shielding the arc with an inert monatomic gas in admixture with from 1% to 20% of a gas selected from the group consisting of carbon monoxide and carbon dioxide.

2. A method of electric arc fusion welding including maintaining an arc between a low carbon steel electrode, having a carbon content of less than 0.35 percent, and the work; and shielding the arc with a gas selected from the group consisting of argon and helium premixed with from 3% to 10% of a gas selected from the group consisting of carbon monoxide and carbon dioxide.

3. A method of electric arc fusion welding including maintaining an arc between a low carbon steel electrode, having a carbon content of less than 0.35 percent, and the work; and shielding the arc with argon premixed with from 3% to 10% of a gas selected from the group consisting of carbon monoxide and carbon dioxide.

4. A method of electric arc fusion welding including maintaining an arc between a low carbon steel electrode having a carbon content of less than .35 percent, and the work; and shielding the arc with a gas selected from the group consisting of argon and helium premixed with from 3 percent to 10 percent carbon dioxide gas.

(References on following page)

References Cited in the file of this patent

UNITED STATES PATENTS

| | | |
|---|---|---|
| 2,473,600 | Lobosco | June 21, 1949 |
| 2,497,631 | Rothschild | Feb. 14, 1950 |
| 2,504,867 | Muller | Apr. 18, 1950 |
| 2,544,711 | Mikhalapov | Mar. 13, 1951 |
| 2,576,793 | Jordan | Nov. 27, 1951 |
| 2,590,084 | Bernard | Mar. 25, 1952 |
| 2,694,763 | Muller | Nov. 16, 1954 |
| 2,694,764 | Muller | Nov. 16, 1954 |

FOREIGN PATENTS

| | | |
|---|---|---|
| 191,910 | Great Britain | Jan. 25, 1923 |

OTHER REFERENCES

"Arc Discharge Not Obtained in Pure Argon Gas" by Doan and Myer in Physical Review, volume 40, April 1, 1932, pages 36–39.

"Researches in Arc Welding" by Doan and Myer in Electrical Engineering, November 1932, pages 624–627.

"Arc Welding in Argon Gas" by Doan and Schulte in Electrical Engineering, November 1935, pages 1144–1148.

"Arc Welding in Controlled Atmospheres" by Doan and Smith in Welding Research Supplement of March 1940, pages 1105–1165.

"Fundamentals of Inert-Gas-Shielded Arc Welding" by H. E. Rockefeller in the Welding Journal, August 1951, page 714.